March 26, 1963   O. R. KISER ETAL   3,083,057
GRAVITY GRAIN BOX
Filed Feb. 12, 1959   2 Sheets-Sheet 1
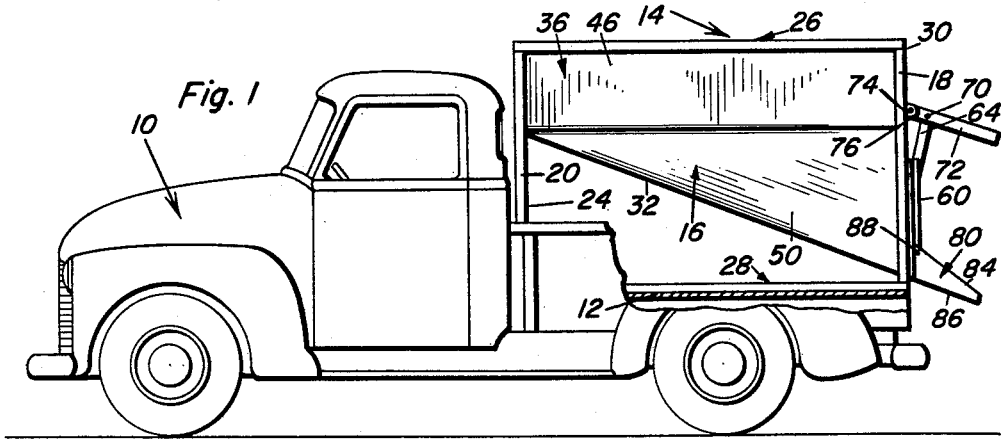
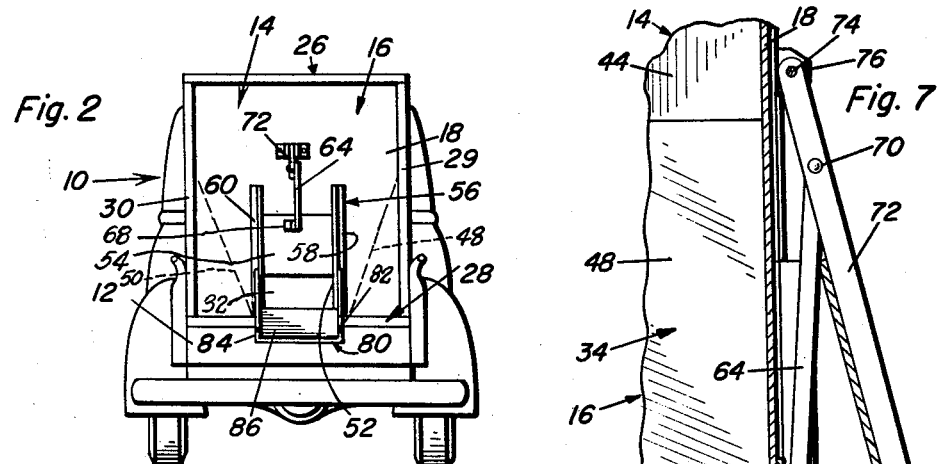
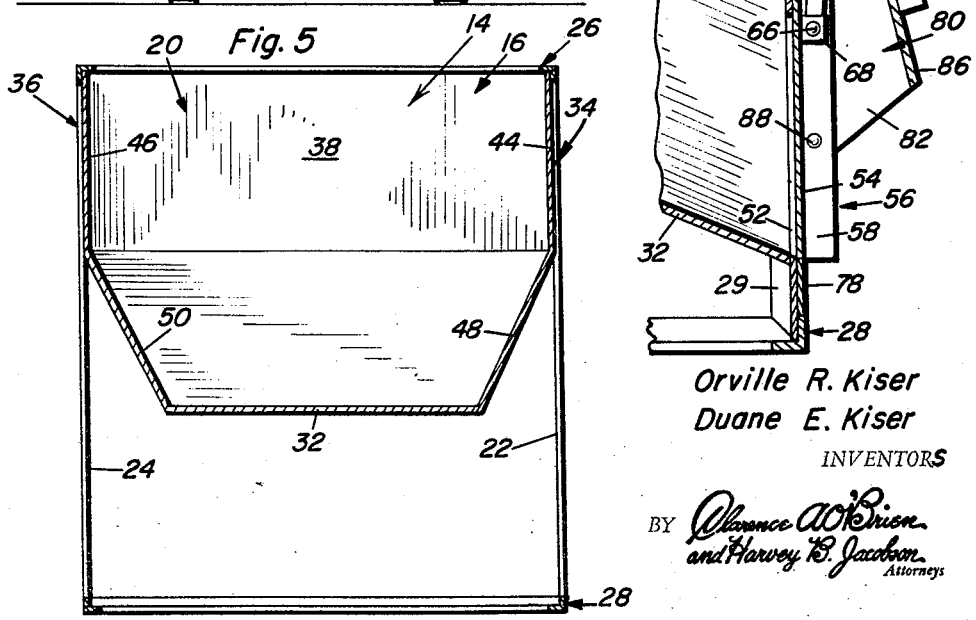
Orville R. Kiser
Duane E. Kiser
INVENTORS March 26, 1963 O. R. KISER ETAL 3,083,057
GRAVITY GRAIN BOX
Filed Feb. 12, 1959 2 Sheets-Sheet 2
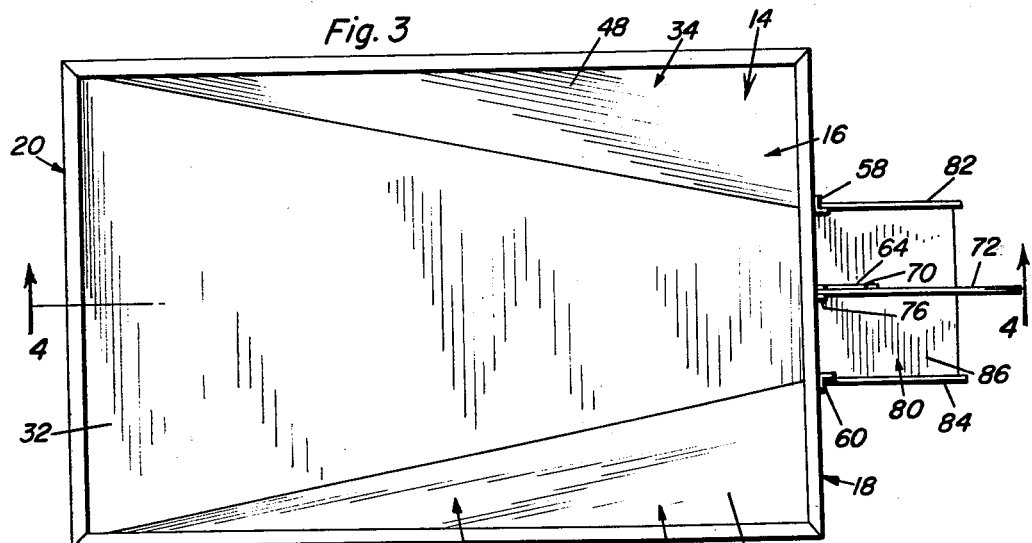
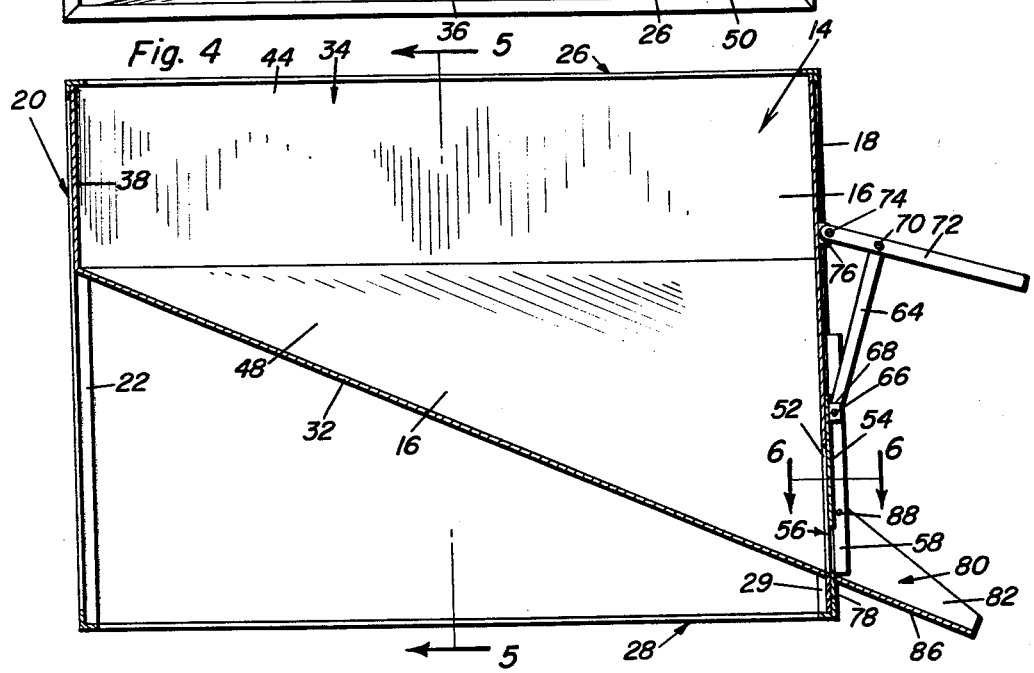
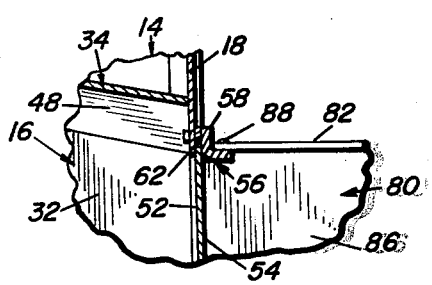
Orville R. Kiser
Duane E. Kiser
INVENTORS

3,083,057
GRAVITY GRAIN BOX
Orville R. Kiser, R.F.D. 3, and Duane E. Kiser, R.F.D. 2, both of Ridgeville, Ind.
Filed Feb. 12, 1959, Ser. No. 792,836
7 Claims. (Cl. 298—7)

This invention relates to a gravity feed box and more particularly to a gravity feed box which is preferably mounted on the bed of a vehicle, for example a truck.

An object of the invention is to provide a gravity feed box especially useful for grain or other granular substance, the box being constructed and arranged to fit onto the original bed of a comparatively inexpensive vehicle, for example, a one-half or three-quarter ton pick up truck. The box is used for handling all small grains, ground feed or other granular or otherwise fluent substance ordinarily found on the farm. The purpose of the invention is to facilitate the handling of granular material. By using the box with a grain blower or grain elevator, a box located on the bed of a truck will eliminate most of the shovelling and sacking of the grain and ground feed on a farm. Further, the box may be used for seed that is sown on the farm such as oats, wheat, rye, soy beans, etc., and the principles of the invention are not restricted to any particular substance with which the box is used.

One of the important features of the invention is a bottom chute which swings up under the granular material control door handle and locks in place when the door is in the closed position.

The box is so constructed that it may be easily made very durable so that each box will provide indefinite service without repair, modification, alteration and maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional truck equipped with a bed and box located on the bed, portions of the truck being shown in section.

FIGURE 2 is a rear view of the truck of FIGURE 1.

FIGURE 3 is a top view of the box.

FIGURE 4 is a sectional view taken on the line 4—4 of FIGURE 3.

FIGURE 5 is a cross-sectional view taken on the line 5—5 of FIGURE 4.

FIGURE 6 is an enlarged sectional view taken on the line 6—6 of FIGURE 4.

FIGURE 7 is an enlarged sectional view showing the chute in the elevated position and held in place by the control door handle.

In the accompanying drawings there is a conventional pick up truck 10 that has a bed 12 and all of the other structures ordinarily supplied by the manufacturer with a pick up truck. Box 14 is disposed on the bed 12 of truck 10. The box has a hopper 16 of special construction and held supported by means of back or rear wall 18 and front wall 20. The front wall may simply be formed of a pair of vertical legs 22 and 24 or may have a panel thereon such as the rear wall 18. In either case, the entire box is structurally reinforced by having an angle iron upper horizontal frame 26, an angle iron lower horizontal frame 28, the latter being optional, and four vertical legs 22, 24, 29 and 30, respectively.

Hopper 16 has a bottom 32, a pair of sides 34 and 36, front wall 38 and the rear wall 18. Side walls 34 and 36 have upper vertical portions 44 and 46 attached to the upper horizontal frame 26, and angulated lower portions 48 and 50 which terminate at the edges of the bottom 32 and which are joined thereto. Therefore, portions of walls 34 and 36 slope downwardly and inwardly toward a longitudinal center line of box 14. Further, the walls 34 and 36 are widest at the inner end of hopper 16, and they converge as they approach the discharge opening 52 which is controlled by vertically sliding door 54. The walls and the sides are each secured to the structural framework that has been previously described.

Vertically sliding door 54 is mounted in a track 56, the track being formed of two vertical angular members 58 and 60 spaced slightly from wall 18 by means of spacers 62 (FIGURE 6) to thereby form track 56. The edges of door 54 are vertically slidable in the track that is constructed in this way.

The means for vertically operating door 54 consists of link 64 connected by pivot pin 66 at its lower end to an ear 68 that protrudes from the surface of door 54. The link is connected by pivot pin 70 at its upper end to the lever 72 which functions as a handle for actuating the door 54. Pivot 70 is located between the ends of lever 72, the inner extremity of the lever having a pivot pin 74 passed through an opening therein and attached to mounting bracket 76 which is welded or otherwise secured to the rear wall 18 of hopper 16. The upward limit of movement of the door is established by elevating the handle lever 72 to the full extent. The lower travel of the door is established by the door contacting stop 78 located at the bottom of track 56.

A chute 80 having a pair of sides 82 and 84 and a bottom 86, is pivoted to the angle members 58 and 60 by means of pivot pins 88. These pins are connected to sides 82 and 84 at the inner upper corners thereof so that when the chute is lowered, the rear edge of bottom 86 contacts a portion of wall 18 establishing the lowered position for the chute at which bottom 86 is in alignment with the inclined bottom 32 of hopper 16.

An important feature of the invention is found in the way that the chute 80 is held in the elevated position (FIGURE 7). When the chute is lifted and lever 72 lowered to the position at which door 54 closes opening 52, the lever has an inner surface abutting the outer surface of chute bottom 84 and this holds the chute in a compact position which is in a generally upright direction. To release the chute 80 so that it will return to the lowered position (FIGURE 4) it is necessary only to elevate the lever 72 thereby essentially simultaneously opening door 54 and enabling the chute 80 to be gravity lowered to the position at which it forms a substantial continuation of the bottom 32 of the hopper.

In use, hopper 16 is loaded through the open top thereof and the truck may be operated in the ordinary way to transport the load to any place desired by the truck operator. To empty the load from the hopper, handle 72 is elevated thereby automatically releasing chute 80 and permitting it to form an inclined extension of hopper bottom 32. The control of the size of opening 52 is obtained by raising or lowering the lever 72 to any elevation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gravity emptied box including a hopper for fluent material, a framework connected with the hopper and adapted to be supported on the bed of a truck, said hopper having side walls, a front and a back wall, said back wall having a discharge opening, a bottom connected to the side walls, front wall and back wall of said hopper and sloping downwardly toward said back wall, a door, a vertical track connected with said back wall and vertically slidably supporting the door, means including a lever mounted for vertical swinging movement on the back wall over the opening and operatively connected to the door for elevating said door, a vertically swingable chute pivotally connected with said hopper and having a bottom which forms a substantial continuation of said sloping bottom of said hopper when said chute is in a lowered operative position, said lever being movable to a lowered position and engaging the chute when said chute is in a raised inoperative position and the door is in a lowered operative position for positively holding said chute in said raised inoperative position.

2. A gravity emptied box including a hopper for fluent material, a framework connected with the hopper and adapted to be supported on the bed of a truck, said hopper having side walls, a back wall and a front wall, said back wall having a discharge opening, a bottom connected to the side walls, front wall and back wall of said hopper and sloping downwardly toward said back wall, a door, a vertical track connected with said back wall and vertically slidably supporting the door, means including a lever mounted for vertical swinging movement on the back wall over the opening and operatively connected to the door for elevating said door, a vertically swingable chute on said hopper and having a bottom which forms a substantial continuation of said sloping bottom of said hopper when said chute is in a lowered operative position, said lever being movable to a lowered position and engaging the chute when said chute is in a raised inoperative position and the door is in a lowered operative position, said lever being movable to a lowered position and engaging the chute when said chute is in a raised inoperative position and the door is in a lowered operative position for positively holding said chute in said raised inoperative position, said chute being released to be gravity lowered when said lever is moved in an upward direction, and the side walls of said hopper having portions which slope downwardly and inwardly toward said bottom of said hopper.

3. The combination of claim 2 wherein there are means pivotally connecting said chute to said track at the rear of said hopper.

4. In combination with the bed of a truck, said bed having front and rear ends, a hopper having an open top, sides, front and rear end walls and a bottom which slopes downwardly toward the rear end of said bed, said rear end wall of said hopper having a discharge opening, a door, means mounting said door on said hopper for vertical sliding movement to control the opening, a chute having a bottom and sides, means connected to said chute sides pivotally mounting said sides on the rear of the hopper for vertical swinging movement, said chute bottom forming an essentially coplanar continuation of the bottom of said hopper when the chute is in the lowered position, vertically swingable door actuating means connected with said door and said hopper and including a lever directly engageable with said chute when said chute is in an elevated inoperative position and positively holding said chute in said elevated position until said lever is swung upwardly out of engagement with the chute.

5. In combination with the bed of a truck, said bed having front and rear ends, a hopper having an open top, sides, front and rear end walls and a bottom which slopes downwardly toward the rear end of said bed, said rear end wall of said hopper having a discharge opening, a door, means mounting said door on said hopper for vertical sliding movement to control the opening, a chute having a bottom and sides, means connected to said chute sides pivotally mounting said sides on the rear of the hopper for vertical swinging movement, said chute bottom forming an essentially coplanar continuation of the bottom of said hopper when the chute is in the lowered position, vertically swingable door actuating means connected with said door and said hopper and including a lever directly engageable with said chute when said chute is in an elevated inoperative position and positively holding said chute in said elevated position until said lever is swung upwardly out of engagement with the chute, and a structural framework beneath said hopper to support said hopper on the bed.

6. A box comprising a hopper for the reception of fluent material, said hopper having therein a discharge opening for the material, a chute hingedly mounted on the hopper for receiving the material from the opening and swingable vertically to operative lower and inoperative upper positions, a vertically slidable closure on the hopper for controlling the opening when in a lowered operative position, and common means for actuating the closure and for securing the chute in said inoperative position, said means including a vertically swingable lever pivotally mounted on the hopper and operatively connected to the closure and movable to a lowered position and engaging the chute when said chute is in said inoperative position and the closure is in said operative position for positively holding said chute in said inoperative position.

7. A box comprising a hopper for the reception of fluent material, said hopper having in its lower portion a discharge opening for the material, a chute hingedly mounted on the hopper for receiving the material from the opening, said chute being vertically swingable to raised and lowered inoperative and operative positions, respectively, a vertically slidable closure on the hopper for controlling the opening, and common means for actuating the closure and for securing the chute in inoperative position, said means including a vertically swingable lever pivotally mounted on the hopper and operatively connected to the closure and movable to a lowered position for closing the closure and engaging, when in said lowered position and the chute is in said raised position, behind said chute for positively holding same in said raised positon.

References Cited in the file of this patent

UNITED STATES PATENTS

| | | |
|---|---|---|
| Re. 6,783 | Bailey | Dec. 7, 1875 |
| 161,543 | Patton | Mar. 30, 1875 |
| 169,060 | Thompson | Oct. 19, 1875 |
| 427,851 | Gibbs | May 13, 1890 |
| 471,402 | Sheldon | Mar. 22, 1892 |
| 718,742 | Umholtz | Jan. 20, 1903 |
| 1,010,194 | Smith | Nov. 28, 1911 |
| 1,425,814 | Valerius et al. | Aug. 15, 1922 |
| 1,892,698 | Fildes | Jan. 3, 1933 |
| 2,169,350 | Wallace | Aug. 15, 1939 |
| 2,337,817 | Hertrich | Dec. 28, 1943 |
| 2,529,558 | Klingebiel | Nov. 14, 1950 |
| 2,573,293 | Zuber | Oct. 30, 1954 |
| 2,675,947 | Wynn | Apr. 20, 1954 |

FOREIGN PATENTS

| | | |
|---|---|---|
| 5,111 | Great Britain | Apr. 1, 1915 |